(12) United States Patent
Jutzi et al.

(10) Patent No.: US 7,211,000 B2
(45) Date of Patent: May 1, 2007

(54) GAMING UTILIZING ACTUAL TELEMETRY DATA

(75) Inventors: Curtis E. Jutzi, Lake Oswego, OR (US); Jay Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 596 days.

(21) Appl. No.: 09/218,822

(22) Filed: Dec. 22, 1998

(65) Prior Publication Data

US 2001/0003715 A1 Jun. 14, 2001

(51) Int. Cl.
*A63F 13/00* (2006.01)
*A63F 9/24* (2006.01)
*G06F 17/00* (2006.01)
*G06F 19/00* (2006.01)

(52) U.S. Cl. ............... 463/40; 463/41; 463/42; 463/43; 273/317

(58) Field of Classification Search ............ 463/40–45, 463/31, 35, 37, 2, 4, 6; 273/317, 317.2, 317.3, 273/317.4, 317.5, 317.6, 329, 371, 246, 461
See application file for complete search history.

(56) References Cited

U.S. PATENT DOCUMENTS

| | | | | |
|---|---|---|---|---|
| 4,028,733 A * | 6/1977 | Ulicki | ................ | 360/10 X |
| 4,141,548 A * | 2/1979 | Everton | ................ | 273/1 E X |
| 4,496,148 A * | 1/1985 | Morstain et al. | ........ | 273/1 E X |
| 4,582,323 A * | 4/1986 | Minkoff et al. | ........... | 273/94 X |
| 4,662,635 A * | 5/1987 | Enokian | ................ | 273/94 X |
| 5,149,104 A * | 9/1992 | Edelstein | ............... | 273/434 X |
| 5,189,630 A * | 2/1993 | Barstow et al. | ............ | 309/246 |
| 5,363,297 A   | 11/1994 | Larson et al. | ............... | 364/401 |
| 5,423,555 A * | 6/1995 | Kidrin | .................... | 273/434 X |
| 5,462,275 A * | 10/1995 | Lowe et al. | .............. | 273/94 X |
| 5,513,854 A * | 5/1996 | Daver | ........................ | 364/410 |
| 5,526,479 A * | 6/1996 | Barstow et al. | ............ | 395/173 |
| 5,558,339 A * | 9/1996 | Perlman | ................... | 463/42 X |
| 5,630,757 A * | 5/1997 | Gagin et al. | .............. | 463/43 X |
| 5,640,453 A * | 6/1997 | Schuchman et al. | ...... | 380/10 X |
| 5,695,401 A * | 12/1997 | Lowe et al. | ................ | 463/4 X |
| 5,714,997 A * | 2/1998 | Anderson | ................... | 348/36 |
| 5,820,463 A * | 10/1998 | O'Callaghan | ............. | 463/42 X |
| 5,861,881 A   | 1/1999 | Freeman et al. | ........... | 345/302 |
| 5,876,286 A * | 3/1999 | Lee | ........................... | 463/31 X |
| 5,890,906 A * | 4/1999 | Macri et al. | ................ | 434/247 |
| 5,936,661 A * | 8/1999 | Trew | ........................ | 348/13 X |
| 6,007,427 A * | 12/1999 | Wiener et al. | ........... | 463/17 X |
| 6,020,851 A   | 2/2000 | Busack | ........................ | 342/457 |
| 6,080,063 A * | 6/2000 | Khosla | ........................ | 463/42 |

(Continued)

OTHER PUBLICATIONS

"Tech Encyclopedia", http://www.techweb.com/encyclopedia, 1 page, (Nov. 23, 1998).

*Primary Examiner*—Xuan M. Thai
*Assistant Examiner*—Binh-An D. Nguyen
(74) *Attorney, Agent, or Firm*—Schwegman, Lundberg, Woessner & Kluth, P.A.

(57) ABSTRACT

Gaming utilizing actual telemetry data. In one embodiment, a system including a source of actual telemetry data regarding an event, such as a sporting event, and a gaming application utilizing the actual telemetry data. In one embodiment, by utilizing actual telemetry data, the ability to play a game as if the game player were involved in a current sporting event, in real-time, is provided.

24 Claims, 2 Drawing Sheets

U.S. PATENT DOCUMENTS 6,100,917 A * 8/2000 Tsutsui et al. ............... 725/105
6,155,927 A * 12/2000 Levasseur et al. ............ 434/69
6,195,090 B1 * 2/2001 Riggins, III ........... 340/870.03
2001/0042105 A1 * 11/2001 Koehler et al. ............. 709/217
2002/0138587 A1 9/2002 Koehler et al. ............. 709/207

* cited by examiner

GAMING UTILIZING ACTUAL TELEMETRY DATA

FIELD OF THE INVENTION

This invention relates generally to gaming, such as gaming computer programs, and more particularly to gaming utilizing actual telemetry.

BACKGROUND OF THE INVENTION

A popular pastime that has evolved in the past twenty years is video games. Originally, such games, such as Pong, had very crude graphics. However, in the past decade, as computer technology has become more sophisticated, the games themselves have also become more sophisticated. The graphics for such games, for example, are approaching life-like quality. Game players also have a wide variety of gaming platforms to choose from: from stand-alone video games in arcades, to gaming application software that runs on personal computers (PC's), to game media that runs on dedicated gaming platforms, such as those available from Nintendo, Inc., Sony, Inc., and Sega, Inc.

One particular type of game that has proven popular is that which is based on a sports theme, such as racing car, golf, baseball, and football games. These types of games are also becoming increasingly sophisticated. Such games may have aspects that are based on their real-life counterparts. For example, in a racing car game, the racing cars may be patterned after real NASCAR and INDY cars; in a golf game, the golf courses may be patterned after real courses; etc. Such games have proven to be very popular among game players. Any increase in the verisimilitude of these types of games thus generally finds a willing market among game players.

SUMMARY OF THE INVENTION

The invention provides for gaming utilizing actual telemetry data. In one embodiment, a system includes a source of actual telemetry data regarding an event (for example, in one embodiment, a sporting event), and a gaming application utilizing the actual telemetry data. The invention includes systems, methods, and machine-readable media of varying scope.

By utilizing actual telemetry data, at least some embodiments provide for the ability to play a game as if the game player were involved in a current sporting event, in real-time. For example, in a sporting event such as the INDY 500, the game player is able to be a race car driver, where the other race cars are not computer simulations based on fictitious or historical data, but are based on the actual telemetry data being transmitted in substantially real-time from the event to the game player's game platform.

The invention provides for and includes embodiments, advantages and aspects in addition to those described here, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
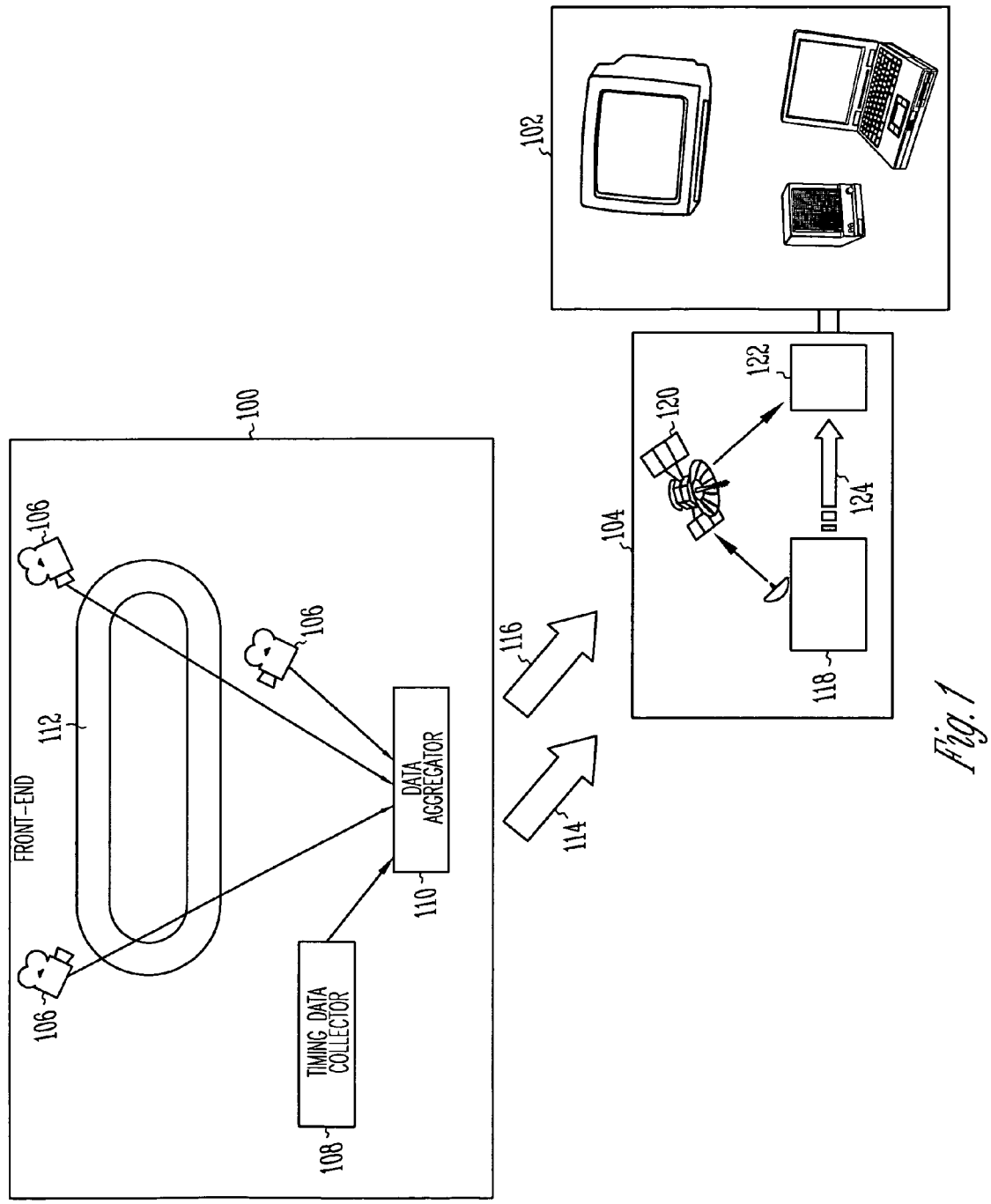
FIG. 1 shows a diagram of a system according to an embodiment of the invention.

Referring first to FIG. 1, a system according to an embodiment of the invention is shown. The system of FIG. 1 relates specifically to a sports event that relates to auto racing; the invention itself, however, is not so limited. For example, other embodiments of the invention can relate to golf, baseball, tennis, football, basketball, hockey, as well as other sports. As another example, other embodiments can relate to events other than sports, such as any gaming situation, or any other type of event, such as a space shuttle launch, parades, recreational events simulated using animated characters from other domains (e.g., popular cartoon programs on television), lunar landings, Mars landings, etc. The invention is not so limited—any simulation space is amenable to the invention. The system of FIG. 1 includes a source of actual telemetry data 100, a gaming application 102, and a transport medium 104.

The source of actual telemetry data 100 relates to the sporting event; in the case of FIG. 1, auto racing. For example, the source 100 in this embodiment is based on a number of cameras 106 positioned around a race track 112 and a Swiss timing data collector 108 (the latter to obtain the actual race timing data as officially used within the race), feeding a data aggregator 110. The cameras 106 and the Swiss timing data collector 108 are data capture equipment, which are used to capture data regarding the sporting event, such as from the contestants of the event (in this case, their racing cars). Other measurement instruments may include speed sensors, tire pressure sensors, etc., on the race cars themselves (not shown in FIG. 1). The telemetry data thus includes quantitative measurements of characteristics of the race track 112 and of the race cars traveling around the race track 112.

The telemetry data (represented by the arrow 114 of FIG. 1) collected by the data aggregator 110 is fed to the transport medium 104, along with the actual audio-video streams from the cameras 106 (represented by the arrow 116 of FIG. 1). In one embodiment, the aggregator 110 includes a transceiver to communicate the information to the transport medium 104. The invention is not limited to the manner by which data is collected and transported. The audio-video stream may be digitized and transported according to any multicast delivery technology. Such technologies include the Real Networks G2 architecture available from Real Networks, Inc., the NetShow architecture available from Microsoft Corp., and the ActiveRTP architecture available from Intel Corp.; the invention is not so limited. The data aggregator 110 can in one embodiment be a dedicated piece of hardware for this purpose, or in another embodiment can be a personal computer (PC) running software designed for this purpose; the invention is not so limited.

The transport medium 104 is to communicate the telemetry data from the source 100 to the gaming application 102. In the embodiment of FIG. 1, the medium 104 includes a satellite uplink 118, which uploads the data (and the audio-video stream) to a satellite 120, from which it is downloaded by a downlink 122, and then sent over a network (not shown in FIG. 1), such as the Internet, an intranet, or an extranet—although the invention is not so limited—to the gaming application 102. The downlink 122 is thus communicatively coupled to the data aggregator 110, in that it receives data collected by the aggregator 110. In another embodiment, rather than the uplink uploading the data to the satellite 120, the uplink transmits the data to the downlink 122 via a direct-link cable connection 124.

The gaming application 102 is in one embodiment run on a gaming platform. The platform can in different embodiments be a personal computer (PC), a video-gaming system console such as those available from Sony, Inc., Nintendo, Inc., and Sega, Inc., as well as a stand-alone video game as found in arcades. Other embodiments include a set-top box for a television set. The invention is not so limited. The gaming application 102 utilizes the actual telemetry data received, and in one embodiment, the audio-video stream also received. The gaming application 102 is in one embodiment a computer program that runs on the platform, where the computer program includes a series of processor-executable instructions for execution by a processor of the platform.

The invention is not necessarily limited by the manner in which the gaming application 102 utilizes the telemetry data and audio-video stream. In one embodiment, the gaming application 102 utilizes the actual telemetry data to display a simulated version of the sporting event. For example, rather than displaying a live view of the sporting event, the application 102 displays a simulated version of the sporting event based on the actual telemetry data received. This is advantageous in that the application 102 can provide for camera shots and angles that may not necessarily be covered by one of the cameras 106. For example, the application 102 can be configured to follow a predetermined racing car, such that a virtual camera follows this car around the track, using the actual telemetry data received. Thus, in this embodiment, the application 102 provides a passive viewing experience of the event, but enhances the experience as opposed to the actual audio-video stream of the event by providing for other manners by which the event may be seen and heard.

In another embodiment of the invention, the gaming application 102 utilizes the actual telemetry data to provide a user-participatory simulated version of the sporting event. For example, where the sporting event is a particular car racing event such as the INDY 500, a game player is able to race his or her own car against the actual cars in the event, while the event is taking place. This compares to prior art gaming applications, where the other cars may be fictitious, or merely based on historical data of actual cars—in this embodiment of the invention, the other cars are the actual cars as they are being raced, substantially in real-time. In other words, the game player does not race his or her game car against fictitious cars or only against actual cars in a fictitious event, but against actual cars in an actual event, as those cars are performing in the event.

In this embodiment of the invention described, the invention is not limited as to the manner by which the game player views the other race cars as displayed by the gaming application 102. In one embodiment, the gaming application 102 utilizes the audio-visual stream, as represented in FIG. 1 by arrow 116, as the backdrop of the game, against which the gaming application 102 renders a virtual car driven and controlled by the game player. In another embodiment, the gaming application 102 utilizes the telemetry data, as represented in FIG. 1 by arrow 114, as the backdrop of the game, rendering these actual cars as well as the virtual car driven and controlled by the game player. The invention is not particularly limited to either embodiment, however.

As has been described, the invention provides for advantages not found in the prior art. The availability of telemetry data provides for the gaming application to map out specified race courses, and utilizing the telemetry data to determine the speed, direction, actions, etc., of specific competitors in the race. This allows the game player to immerse him or herself in the race by actually driving his or her own virtual vehicle against other vehicles being controlled by the live simulcast telemetry data. Furthermore, the gaming application provides for a game player to be able to view the race from any vehicle in the race, as well as from the stands, or any simulated camera angle, and focus on any one or more participants in the race itself.

As has been described, an embodiment of the invention relates to the utilization of actual real-time data in substantially real-time, for substantially immediate utilization by the gaming application. However, the invention itself is not so limited. For example, in another embodiment, the actual telemetry data is not immediately conveyed via the data transport 104 to the application 102, but rather is stored on a storage, such as a compact-disc read-only-memory (CD-ROM) (or other removable storage medium), a server, etc., for later utilization by the gaming application. In this instance, the source of actual telemetry data for use by the gaming application is the storage, storing the data as previously captured by the data capture equipment. The advantage to this approach is that a gaming player, for example, may be able to purchase actual telemetry data based on historical events. Thus, for example, in a baseball application, the player can face the given pitcher of the opposite team, as that pitcher actually performed in a specific game (as opposed to general historical information regarding the pitcher). Those of ordinary skill within the art can appreciate that the invention is not limited to either embodiment, however.

Figure 2:
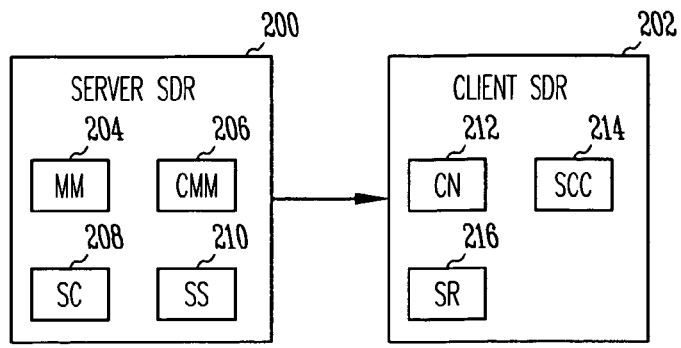
FIG. 2 shows a diagram of a system according to another embodiment of the invention.

The system of FIG. 1 is not limited by the manner in which it is implemented. However, in one embodiment of the invention, it is implemented as is shown in FIG. 2. The system of FIG. 2 includes a server software development kit (SDK) 200 and a client software development kit (SDK) 202. Each of the SDK's 200 and 202 is a collection of software components, where each software component includes a series of processor instructions. The server SDK 200 resides on a server computer that is responsible for receiving captured telemetry data, and the client SDK 202 resides on a client computer that is responsible for execution of a gaming application per an embodiment of the invention.

The server SDK 200 includes four components, a media manager 204, a capture machine manager 206, a server control 208, and a stream sender 210. The media manager 204 is a coordination component on the server-side system. It is responsible for managing system-wide resources such as bandwidth and multicast address assignment. It exports external interfaces used to configure and retrieve information regarding a sporting event. It also manages any head-end issues such as provisioning among various clients, as well as address allocation among clients.

The capture machine manager 206 is a component used to manage stream sender objects, where each stream sender object sends a stream relating to a specific sporting event. It provides for creating and deleting such objects. It exposes external interfaces used to configure and monitor information about itself and the stream sender objects, as well as internal interfaces used to coordinate itself with the media manager 204.

The server control 208 is used to communicate announcements from the server to the client, such as delivering events and announcements to the client side regarding details of the event while it is taking place. Finally, the stream sender 210 is a component used to manage a particular media stream. It provides for configuring, loading and streaming the media. It exposes external interfaces used to configure this information and stream the media, and internal interfaces used to coordinate itself with the client node 212 of the client SDK 202, and get resources from the media manager 204.

The client SDK 202 includes three components, a client node 212, a server control client 214, and a stream receiver 216. The client node 212 is the main component that coordinates the client side. It exposes external interfaces to monitor system events, and is the main component used by a client-side application, such as a gaming application, to coordinate and deliver media to a user.

The server control client 214 exports an internal interface that can be used to find out information regarding the sporting event while it is taking place. Thus, it is an abstraction that provides for announcements during the event. Finally, the stream receiver 216 manages the configuration of the media stream, exposing an external interface to play the streaming media and internal interfaces to configure it.

Figure 3:
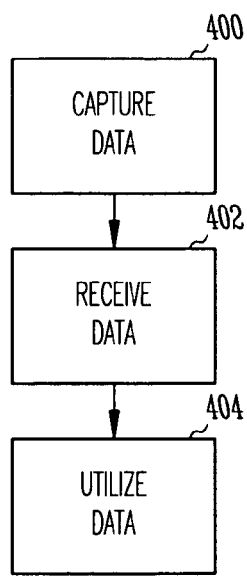
FIG. 3 shows a flowchart of a method according to an embodiment of the invention; and, FIG. 4 shows a diagram of a computer in conjunction with which embodiments of the invention may be practiced.

Referring next to FIG. 3, a method in accordance with an embodiment of the invention is shown. The method is desirably realized at least in part as one or more programs running on a computer—that is, as a program executed from a computer-readable medium such as a memory by a processor of a computer. The programs are desirably storable on a computer (or machine)-readable medium such as a floppy disk or a CD-ROM, for distribution and installation and execution on another computer. Each program desirably includes machine-executable instructions, as known within the art.

In 400, actual telemetry data regarding a sporting event is captured. As has been described, the invention is not particularly limited to a given type of telemetry data, nor a particular kind of sporting event. In 402, the telemetry data is received. For example, the actual telemetry data may be received and stored on a storage for later utilization by a gaming application (where the application retrieves the actual data from a storage storing the data as previously captured by data capture equipment, as has been described), or it may be communicated in substantially real-time for substantially immediate receival and use by a gaming application (where the application retrieves the actual telemetry data in substantially real-time from a transport medium communicatively coupled to data capture equipment to capture in substantially real-time the data, as has also been described). The invention is not particularly limited.

Finally, in 404, the actual telemetry data is utilized within a gaming application, as has also been described. Thus, the utilization may include displaying a non-participatory simulated version of the sporting event based on the data, or may include providing a user-participatory simulated version of the sporting event based on the data. The invention is not particularly limited.

Figure 4:
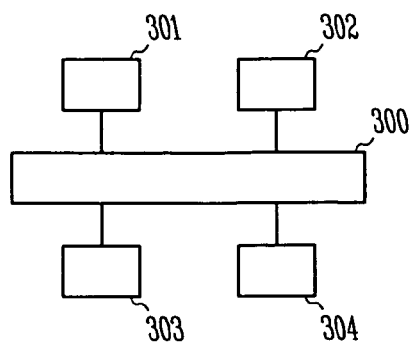

Referring finally to FIG. 4, a diagram of a computer in conjunction with which embodiments of the invention may be practiced is shown. The computer comprises bus 300, keyboard interface 301, external memory 302, mass storage device 303 and processor 304. Bus 300 can be a single bus or a combination of multiple buses. Bus 300 can also comprise combinations of any buses. Bus 300 provides communication links between components in the computer. Keyboard controller 301 can be a dedicated device or can reside in another device such as a bus controller or other controller. Keyboard controller 301 allows coupling of a keyboard to the computer system and transmits signals from a keyboard to the computer system. External memory 302 can comprise a dynamic random access memory (DRAM) device, a static random access memory (SRAM) device, or other memory devices. External memory 302 stores information from mass storage device 303 and processor 304 for use by processor 304. Mass storage device 303 can be a hard disk drive, a floppy disk drive, a CD-ROM device, or a flash memory device. Mass storage device 304 provides information to external memory 302. Processor 304 can be a microprocessor and may be capable of decoding and executing a computer program such as an application program or operating system with instructions from multiple instruction sets.

Gaming utilizing actual telemetry data has been described. Although specific embodiments have been illustrated and described herein, it will be appreciated by those of ordinary skill in the art that any arrangement which is calculated to achieve the same purpose may be substituted for the specific embodiments shown. For example, while one embodiment has been described with respect to a sporting event that is related to racing, the invention itself is not so limited. This application is intended to cover any adaptations or variations of the present invention. For example, the application covers embodiments of the invention relating to non-racing sporting events, such as golf, tennis, etc. Therefore, it is manifestly intended that this invention be limited only by the following claims and equivalents thereof.

We claim:

1. A system comprising:
   a source of actual telemetry data regarding an event, wherein the actual telemetry data comprises quantitative data measurements of characteristics of the event, and wherein the source comprises at least one data measurement instrument to collect the quantitative data measurements;
   a media manager to manage bandwidth and multicast address assignment and to export interfaces used to configure and retrieve the actual telemetry data;
   a capture manager to manage stream objects, wherein each stream object is to send a stream relating to the event;
   a controller to communicate announcements regarding the event via an exported internal interface; and
   a gaming application utilizing the actual telemetry data to provide a viewing experience of the event comprising viewing shots and angles not covered by cameras at the event.

2. The system of claim 1, wherein the event comprises a sporting event.

3. The system of claim 1, wherein the source of actual telemetry data comprises a storage storing the data as previously captured by data capture equipment.

4. The system of claim 3, wherein the storage is selected from a group essentially consisting of: a removable storage medium and a server.

5. The system of claim 1, wherein the source of actual telemetry data comprises data capture equipment to capture data from each of at least one contestant of the event.

6. The system of claim 5, further comprising a transport medium to communicate the actual telemetry data from the source to the gaming application.

7. The system of claim 6, wherein the transport medium comprises:
   a transceiver coupled to the data capture equipment; and,
   an uplink coupled to the transceiver.

8. The system of claim 7, wherein the transport medium further comprises:
   a downlink communicatively coupled to the transceiver; and,
   a network communicatively coupling the downlink to the gaming application.

9. The system of claim 8, wherein the network is selected from a group essentially consisting of: the Internet, an intranet, and an extranet.

10. The system of claim 1, wherein the event is selected from a group essentially consisting of: auto racing, golf, baseball, football, basketball, tennis, and hockey.

11. The system of claim 1, wherein the gaming application is run on a platform selected from a group essentially consisting of: a computer, a television set-top box, a stand-alone video game, and a video-gaming system console.

12. The system of claim 1, wherein the gaming application utilizes the actual telemetry data to display a simulated version of the event.

13. The system of claim 1, wherein the gaming application utilizes the actual telemetry data to provide a user-participatory simulated version of the event.

14. A method comprising:
   capturing actual telemetry data regarding an event, wherein the actual telemetry data comprises quantitative data measurements of characteristics of the event, and wherein capturing further comprises collecting the quantitative data measurements from at least one data measurement instrument;
   managing bandwidth and multicast address assignment, and exporting interfaces used to configure and retrieve the actual telemetry data using a media manager;
   communicating announcements regarding the event via an exported internal interface; and
   utilizing the actual telemetry data within a gaming application to provide a viewing experience of the event comprising viewing shots and angles not covered by cameras at the event.

15. The method of claim 14, wherein the event comprises a sporting event.

16. The method of claim 14, further comprising storing the actual telemetry data on a storage for later utilization by the gaming application.

17. The method of claim 14, wherein utilizing the actual telemetry data within a gaming application comprises displaying a non-participatory simulated version of the sporting event based on the actual telemetry data.

18. The method of claim 14, wherein utilizing the actual telemetry data within a gaming application comprises providing a user-participatory simulated version of the sporting event based on the actual telemetry data.

19. A machine-readable medium having processor instructions stored thereon for execution by a processor to perform a method comprising:
   receiving actual telemetry data regarding an event, wherein the actual telemetry data comprises quantitative data measurements of characteristics of the event, and wherein the actual telemetry data is collected via at least one data measurement instrument;
   managing bandwidth and multicast address assignment, and exporting interfaces used to configure and retrieve the actual telemetry data using a media manager;
   communicating announcements regarding the event via an exported internal interface; and
   utilizing the actual telemetry data regarding the event in an application to provide a simulated version of the event, wherein the simulated version comprises a viewing experience of the event comprising viewing shots and angles not covered by cameras at the event.

20. The machine-readable medium of claim 19, wherein the event comprises a sporting event.

21. The machine-readable medium of claim 19, wherein receiving actual telemetry data regarding an event comprises retrieving the actual telemetry data from a storage storing the data as previously captured by data capture equipment.

22. The machine-readable medium of claim 19, wherein receiving actual telemetry data regarding an event comprises retrieving the actual telemetry data in substantially real-time from a transport medium communicatively coupled to data capture equipment capturing in substantially real-time the data.

23. The machine-readable medium of claim 19, wherein utilizing the actual telemetry data regarding a sporting event to provide a simulated version of the event comprises utilizing the actual telemetry data to display a non-participatory simulated version of the sporting event.

24. The machine-readable medium of claim 19, wherein utilizing the actual telemetry data regarding an event to provide a simulated version of the event comprises utilizing the actual telemetry data to provide a user-participatory simulated version of the event.

* * * * *